W. J. DEHN.
BOLT HOLDER.
APPLICATION FILED OCT. 20, 1919.
1,334,352. Patented Mar. 23, 1920.
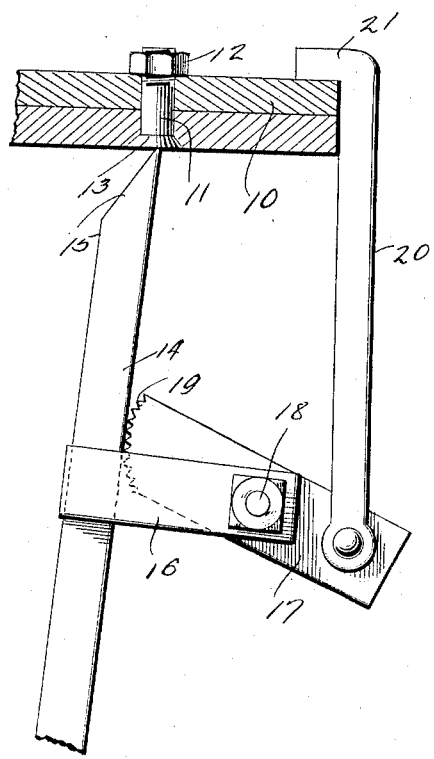
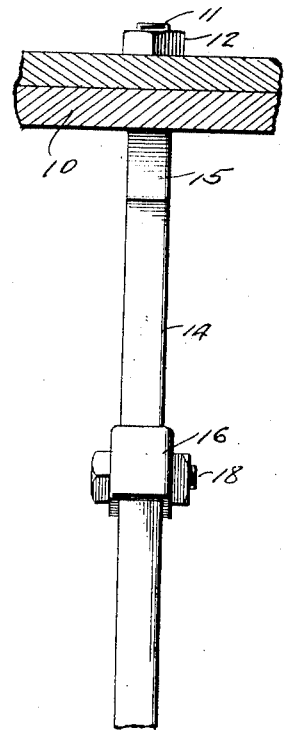

UNITED STATES PATENT OFFICE.

WILLIAM J. DEHN, OF BLENKER, WISCONSIN.

BOLT-HOLDER.

1,334,352.  Specification of Letters Patent.  Patented Mar. 23, 1920.

Application filed October 20, 1919. Serial No. 332,095.

*To all whom it may concern:*

Be it known that I, WILLIAM J. DEHN, a citizen of the United States, residing at Blenker, in the county of Wood, State of Wisconsin, have invented certain new and useful Improvements in Bolt-Holders; and I do hereby declare the following to be a full, clear, and exact description of the invention, such as will enable others skilled in the art to which it appertains to make and use the same.

This invention relates to new and useful improvements in bolt holders and particularly to devices for holding flat headed bolts while the nuts are being screwed on or off.

One object of the present invention is to provide a novel and improved device of this character by means of which a firm grip can be gotten on the head of the bolt so as to effectively prevent rotation of the bolt while the nut is being turned off, the device being especially useful where the bolt and nut have become rusted together, or where the usual screw driver slot of the head has become damaged and will not retain the end of the screw driver.

Another object is to provide a novel and improved device of this character which is capable of adjustment to engage with the bolt and the material in which the bolt is disposed, especially where the thickness of the material varies.

Other objects and advantages will be apparent from the following description when taken in connection with the accompanying drawing.

In the drawing:

Figure 1 is an elevation of the bolt holding device in position for use.

Fig. 2 is an edge view of the device, looking toward the right in Fig. 1.

Referring particularly to the accompanying drawing, 10 represents the material or work in which the bolt to be removed is engaged, said bolt being shown at 11, and having the nut 12 on one end and the head 13 on the other end.

It often happens that where the head of the bolt was originally formed with a slot in which the end of a screw driver could be engaged to hold the bolt, while the nut was being unscrewed, the side walls of this slot become broken or rusted to such an extent that the screw driver will not hold, thus permitting the bolt to turn with the nut. In other cases, where the head of the bolt is flat, or countersunk into the work, and has no slot, the removal of the nut is extremely difficult. The particular object of the present invention is to provide such a device as will firmly grip the head of the bolt and the work, so that the bolt will be held stationary, and the removal of the nut rendered easy.

As shown, 14 represents a lever which has one end beveled off, at 15 to provide a chisel point for biting engagement in the head of the bolt. Engaged in embracing relation with the shank of the lever is a loop strap 16, the ends of which are disposed in straddling relation to a block 17 and secured thereto by means of the pivot bolt 18. The end of this block, adjacent the lever, is rounded eccentrically and formed with transverse teeth 19 for biting engagement with the adjacent face of the lever. To the other end of this block there is pivotally connected one end of an L-shaped arm 20, the angularly extending portion 21 of which is engaged with the work, on the side opposite to the head of the bolt.

In the operation of the device, the arm 20 is first engaged with the work, and then the lever 14 adjusted through the loop strap until its chisel edge engages with the face of the head of the bolt. A tap with a hammer may be given on the outer end of the lever to force its chisel edge into the head of the bolt. By grasping the lever and exerting pressure thereon, in a direction away from the arm 20, the chisel edge will be forced firmly up against the bolt head, while the arm 20 will be drawn downwardly into firm engagement with the work. The bolt will thus be held against turning, and the removal of the nut rendered easy.

What is claimed is:

A bolt holding device comprising a lever having a chisel edged portion for biting engagement with the head of the bolt, a loop engaged with the lever, an angular lever for engagement with the work, and a block pivotally connected with the work engaging lever and with the loop, and having an eccentric engaging face for contact with the first-named lever.

In testimony whereof I affix my signature in the presence of two witnesses.

WILLIAM J. DEHN.

Witnesses:
F. H. DE BORD,
CHAS. HARDIES.